United States Patent
Pillala et al.

(10) Patent No.: US 12,518,033 B2
(45) Date of Patent: Jan. 6, 2026

(54) SENSITIVE DATA MANAGEMENT BASED ON ENVIRONMENTS

(71) Applicant: T-Mobile Innovations LLC, Overland Park, KS (US)

(72) Inventors: Gyani Pillala, Frisco, TX (US); Sujit Vasudev, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 133 days.

(21) Appl. No.: 18/600,387

(22) Filed: Mar. 8, 2024

(65) Prior Publication Data

US 2025/0284829 A1    Sep. 11, 2025

(51) Int. Cl.
*G06F 21/62* (2013.01)
*G06F 11/3698* (2025.01)
*G06F 21/44* (2013.01)

(52) U.S. Cl.
CPC .......... *G06F 21/62* (2013.01); *G06F 11/3698* (2025.01); *G06F 21/445* (2013.01); *G06F 2221/2143* (2013.01)

(58) Field of Classification Search
CPC ................................. G06F 21/62; G06F 21/44
See application file for complete search history.

(56) References Cited

U.S. PATENT DOCUMENTS

| | | | | |
|---|---|---|---|---|
| 6,701,514 | B1* | 3/2004 | Haswell | G06F 11/3698 717/124 |
| 2005/0034103 | A1* | 2/2005 | Volkov | G06F 11/3698 717/124 |
| 2006/0248083 | A1* | 11/2006 | Sack | G06F 21/6218 707/999.009 |
| 2009/0222673 | A1* | 9/2009 | Schneck | G06F 21/34 705/317 |
| 2010/0205657 | A1* | 8/2010 | Manring | G06F 21/6218 726/5 |
| 2011/0184993 | A1* | 7/2011 | Chawla | G06F 16/182 718/1 |
| 2012/0036358 | A1* | 2/2012 | Johnson | G06F 21/31 713/168 |
| 2015/0347774 | A1* | 12/2015 | Krstic | G06F 21/44 726/29 |

* cited by examiner

*Primary Examiner* — Ponnoreay Pich

(57) ABSTRACT

A method comprises maintaining, in a sensitive data management system, sensitive data for a plurality of different applications, each in association with a plurality of different environments, transmitting, by an application running in association with the environment, to a sensitive data management system, a request for sensitive data used to access the at least one of the data store or the network site, determining, by a data management application in sensitive data management system, that the application is permitted to receive access to the sensitive data based on the identifier of the application and the identifier of the environment, transmitting, by the data management application, the sensitive data to the application running in association with the environment.

20 Claims, 7 Drawing Sheets

SENSITIVE DATA MANAGEMENT BASED ON ENVIRONMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A software development lifecycle is a systematic and structured process that encompasses the planning, design, implementation, testing, deployment, and maintenance of a software application. The software development lifecycle may begin by creating a detailed plan outlining the architecture and functionalities of an application. The implementation phase may involve the actual coding and development, after which thorough testing may be conducted to identify and rectify any defects. Once testing is successful, the application may be deployed to a production environment where end-users can access and use the application. Ongoing maintenance and updates may be performed on the application, and the process may cycle back to address evolving user needs or to introduce new features.

SUMMARY

In an embodiment, a method implemented in a communication system to perform sensitive data management is disclosed. The method comprises running, by an application platform implemented on a server, an application in association with an environment for testing a configuration of the application. In response to determining, by the application running in association with the environment, that the application is to access at least one of a data store or a network site as part of testing the configuration of the application in the environment, the method further comprises transmitting, by the application running in association with the environment, to a sensitive data management system, a request for sensitive data used to access the at least one of the data store or the network site, wherein the request comprises an identifier of the application and an identifier of the environment, determining, by a data management application in the sensitive data management system, that the application is permitted to receive access to the sensitive data based on the identifier of the application and the identifier of the environment, transmitting, by the data management application, the sensitive data to the application running in association with the environment, and accessing, by the application running in association with the environment, the at least one of the data store or the network site using the sensitive data received from the sensitive data management system. In an embodiment, the sensitive data remains securely stored at the sensitive data management system and unexposed as the application runs in different environments. The method further comprises updating, by the data management application, with the at least one of the data store or the network site, the sensitive data based on a sensitive data rotation policy indicating at least one condition triggering the data management application to update the sensitive data.

In another embodiment, a communication system is disclosed. The communication system comprises sensitive data management system and an application running in association with an environment and on an application platform of a server. The sensitive data management system comprises at least one memory configured to maintain sensitive data for a plurality of different applications, each in association with a plurality of different environments, and wherein each environment comprises one or more test applications, network sites, or data stores used to test a configuration of each application, and a data management application stored in the at least one memory. The application, when executed by at least one processor, the application causes the at least one processor to be configured to determine that the application is to access at least one of a data store or a network site as part of testing the configuration of the application in the environment, and transmit to the sensitive data management system, a request for sensitive data used to access the at least one of the data store or the network site, wherein the request comprises an identifier of the application and an identifier of the environment. The data management application of the sensitive data management system, when executed by the at least one processor, causes the at least one processor to be configured to determine that the application is permitted to receive access to the sensitive data based on the identifier of the application and the identifier of the environment, and transmit the sensitive data to the application running in association with the environment. The application, when executed by the at least one processor, further causes the at least one processor to be configured to access at least one of the data store or the network site using the sensitive data received from the sensitive data management system.

In yet another embodiment, a method implemented in a communication system to perform sensitive data management is disclosed. The method comprises maintaining, in a sensitive data management system, sensitive data for a plurality of different applications, each in association with a plurality of different environments, and wherein each environment comprises one or more test applications, network sites, or data stores used to test a configuration of each application. In response to determining, by an application running in association with an environment, that the application is to access at least one of a data store or a network site as part of testing the configuration of the application in the environment, the method further comprises transmitting, by the application running in association with the environment, to a sensitive data management system, a request for sensitive data used to access the at least one of the data store or the network site, wherein the request comprises an identifier of the application and an identifier of the environment, determining, by a data management application in sensitive data management system, that the application is permitted to receive access to the sensitive data based on the identifier of the application and the identifier of the environment, transmitting, by the data management application, the sensitive data to the application running in association with the environment, and accessing, by the application running in association with the environment, the at least one of the data store or the network site using the sensitive data received from the sensitive data management system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
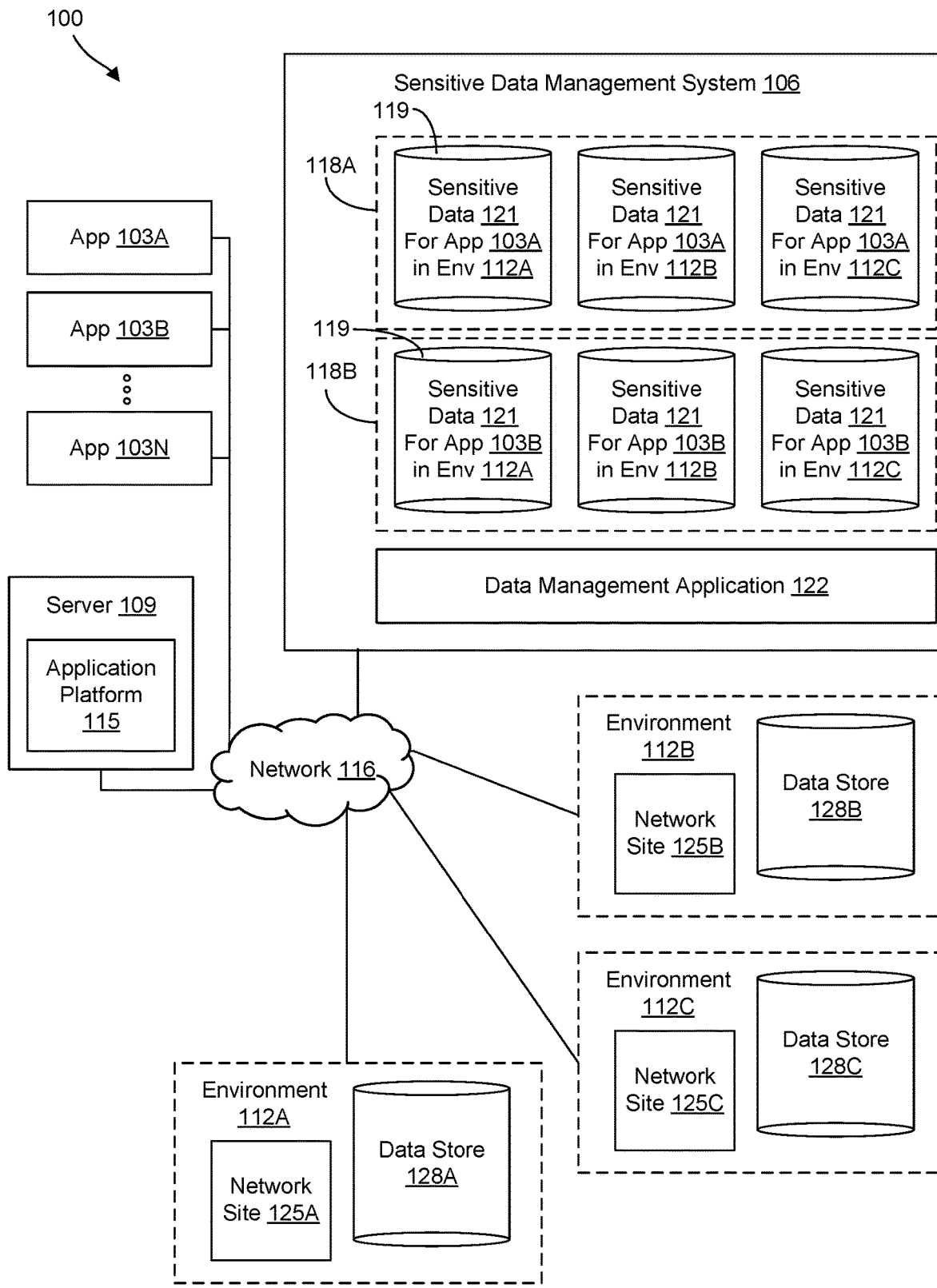
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Within the software development lifecycle, an application typically flows through various environments from application development to end-production, in which each environment serves a specific purpose. Initially, the application may begin at the development environment, in which the developer develops the initial code of the application. Once developed, the application may include the compiled code, configuration files, program files and any dependencies, libraries, etc., all of which may be compiled into executable files and/or packages. In other words, the development environment may be one in which the developer creates a deployable version of the application, which can then be moved to subsequent non-production environments for testing and validation.

Each non-production environment serves a different purpose in a different stage of the software development lifecycle to ensure that the application is thoroughly tested, meets user requirements, and is stable. For example, the non-production environments through which the application may flow include a testing environment for comprehensive testing (e.g., unit testing, integration testing, system testing, etc.), a staging environment simulating the production environment, a quality assurance environment to ensure the application meets specific quality standards, a performance testing environment to assess a performance of the application under different load conditions (e.g., high traffic or large datasets), etc.

Each non-production environment may include various resources and components, which may vary depending on the needs of the software development and testing processes. For example, each non-production environment may include numerous (e.g., hundreds) of test applications from different lines of services within an organization, each of which may be used to perform various tasks or tests on the application. Each non-production environment may also include logical databases, network sites, network testing tools, security components, integration components, external dependencies, collaboration tools, etc. In some cases, the databases and network sites for the different environments may be logically segregated, such that organizations may ensure that applications undergo secure, comprehensive testing in conditions that mimic those that may be encountered in production. In other words, applications running in an environment may only access the databases and network sites for that environment. While the applications running in that environment may or may not be permitted to access resources (e.g., databases and network sites) at other environments, the applications may not have a need to access the resources in the other environments.

Once the application has passed through the testing non-production environments, the application may enter a staging environment, and ultimately enter the production environment. In the production environment, the application is live and accessible to end-users. Therefore, the structured flow through different environments in the software development lifecycle ensures that the application undergoes thorough testing and validation to produce a robust and reliable final version of the application.

In some cases, the developer may include sensitive data in the hard code or configuration files of a newly developed application. Sensitive data may refer to data used by the application to access certain databases and network sites while the application is executing in a particular environment. For example, the sensitive data may include usernames and passwords, certificates, to authenticate the application with the database or network site, keys used for encrypting/decrypting data in the database, tokens used to access various sites, etc. The developer of the application may include the sensitive data in plain text or in an easily decodable format within the code or files of the application, such that the sensitive data may be easily accessed if the application is breached.

For example, an application may include one or more configuration files that explicitly includes the usernames and passwords to access various databases across the different non-production environments, and the usernames and passwords may be easily accessed and compromised when the configuration file is viewed by an external user. Therefore, the sensitive data included in the developed application lacks security in that any unauthorized access into the openly available programming and configuration files of the application may potentially lead to a security breach or hack. Ultimately resolving these types of security breaches and hacks is heavily resource and time intensive, sometimes even requiring the complete reconfiguration of the databases, network sites, and/or applications themselves.

The present disclosure addresses the foregoing technical problems by providing a technical solution in the technical field of software development lifecycle management by introducing a sensitive data management system to store and provide the sensitive data to certain applications, in a more secure and restrictive manner. A communication system including the sensitive data management system may also include various applications, which may be executed on an application platform in association with multiple different environments. Each of the environments may include different resources, such as network sites and data stores, some of which may only be accessed using environment specific sensitive data.

The sensitive data management system may be responsible for storing the sensitive data for each application, in which the sensitive data may be specific to each environment. For example, there may be different combinations of usernames and passwords used to access different data stores across different non-production environments, in which these data stores in each non-production environment are logically segregated. The sensitive data management system may store different sensitive data for each application and for each of the different data stores associated with different non-production environments. In this way, the embodiments disclosed herein prevent the application itself from carrying the sensitive data. Instead, the sensitive data is offloaded to the sensitive data management system, which more securely and reliably stores the sensitive data, in a manner such that third parties that may have access to the application, do not have access to the corresponding sensitive data. Therefore, the use of the sensitive data management system enforces the security of the sensitive data to prevent security breaches and application security related crashes, ultimately leading to more efficient and secure software development lifecycle.

In an embodiment, a developer of the application may provide the sensitive data to the sensitive data management system by first logging-in to the sensitive data management system via a multi-factor authentication scheme. The multi-factor authentication scheme enhances security by requesting the developer to provide more than one form of identification to access the sensitive data management system. For example, a developer of the application may use a separate, client application running on a device of the developer to perform the multi-factor authentication scheme. The multi-factor authentication scheme may request the developer to provide via the client application, for example, at least two or more of a username and password, one-time password, personal identification number (PIN), a smart card, token, biometrics, geolocation, security questions, access codes, universal serial bus (USB) security keys, etc. Once authenticated, the client application may transmit sensitive data for a newly developed application to the sensitive data management system with an identifier of the application. The client application may also transmit an identifier of an environment for which the sensitive data applies (i.e., the sensitive data may be used to access data stores and sites of only one environment, and the identifier identifies the environment).

The sensitive data management system may then store the sensitive data of the application in association with the environment. For example, the sensitive data management system may include a storage bucket (e.g., data stores, databases, memories) for each application stored in association with the identifier of the application. In one embodiment, the sensitive data management system may also include storage buckets based on a combination of the application and the environment in which the application is running, such that each storage bucket stores sensitive data that is not just specific to the application, but also specific to the environment. In another embodiment, the storage bucket may include databases or sub-storage buckets dedicated to each environment in which an application may pass through and to store the sensitive data for the particular environment.

A data management application executing at the sensitive data management system may receive the sensitive data from the client application and extract the identifier of the application and the identifier of the environment. The data management application may logically create or identify a storage bucket for the application based on the identifier of the application, and store the sensitive data in the storage bucket in association with the environment identifier. In this way, the sensitive data management system stores sensitive data that may be used by different applications running in different environments, in which the sensitive data is stored in association with the particular environment to which the sensitive data may be applied, to gain access to a resource of the environment. This way, the application code and program files of the application may no longer include this sensitive data, and instead, the sensitive data is stored in a far more secure location, in which access to this sensitive data is restricted on a per application/per environment basis with various layers of security mechanisms, as described herein.

The developer may test the application being developed or maintained by executing it on an application platform, which may be included in a server, computer system, or cloud-based system having the runtime environments used to execute the package and executable files of the application. The application platform may also include the development tools and debugging utilities that may be used while running the application in association with different environments.

The application platform may first authenticate with the sensitive data management system using, for example, a handshake process. The handshake process may involve the application platform and the sensitive data management system exchanging data to establish communication protocols and negotiate various parameters. For example, the application platform may initiate communications with the sensitive data management system and specify protocols used for communication, encryption algorithms, and data formats. The application platform and the sensitive data management system may authenticate identities to ensure that the communication is secure and authorized. For example, the authentication may involve the exchange of credentials, certificates, tokens, or some other forms of identification. In some cases, an operator of the sensitive data management system may program the sensitive data management system with identifications of application platforms that are permitted to communicate with the sensitive data management system and/or prohibited from communicating with sensitive data management system. The handshake process may include other steps, such as a parameter exchange and a confirmation, which are not limited herein.

Nevertheless, once the handshake process is complete, the application platform may be permitted to communicate with the sensitive data management system. However, authentication with the sensitive data management system is not enough for applications running on the application platform to have access to the sensitive data at the sensitive data management system. In some embodiments, the sensitive data may only be authorized to be sent to an application running on the application platform when certain conditions are met. For example, only applications corresponding to application identifiers stored at the sensitive data management system may be permitted to access the sensitive data within a storage bucket and specific to a particular environment.

As an illustrative example, an application may be running on the application platform in association with a first environment (e.g., an integration non-production environment). While running, the application may attempt to access a resource (e.g., network site or data store) of the first environment. At this time, the application may not have the sensitive data used to access the resource of the first environment, but may transmit a request to the sensitive data management system to receive the sensitive data used to access the resource of the first environment. The request may include an identifier of the application, an identifier of the first environment, and/or an identifier of the resource of the first environment. The data management application may receive the request and determine whether a storage bucket in association with the identifier of the application and/or the identifier of the first environment is maintained at the sensitive data management system. If so, then the data management application may search for the sensitive data stored in association with the identifier of the application, the identifier of the first environment, and/or an identifier of the resource, to retrieve the sensitive data used to access the resource of the first environment. The data management application may send the sensitive data to the application running on the application platform. The application may use the sensitive data to access the resource of the first environment, to perform tasks or steps to perform integration testing on the application.

The sensitive data management system may also be programmed to update the sensitive data (e.g., the passwords) for the different applications and/or environments regularly, based on a sensitive data rotation policy for the sensitive data. The sensitive data rotation policy may define rules or conditions by which the data management application is to update sensitive data for an application and/or an environment. For example, the sensitive data rotation policy may define that sensitive data for a particular application and/or an environment is to be updated in response to a request from the developer or a request from an operator of the sensitive data management system. The sensitive data rotation policy may define that sensitive data for a particular application and/or an environment is to be updated according to a predetermined schedule, or based on regulatory or organizational requirements. For example, a regulatory or organizational requirement may indicate that the sensitive data for an application running in an environment should be updated every 2 months, or a predetermined schedule may indicate that the sensitive data for an application running in an environment should be updated every 6 months. In some cases, the data management application may communicate with the network site or data store at the environment to update the sensitive data in accordance with the sensitive data rotation policy. To this end, the data management application may be granted authorization to update the sensitive data associated with the network sites and data stores across the different environments.

Operators of the sensitive data management system may have read/write access to the sensitive data, for example, such that when an operator is notified that the sensitive data associated with a particular database has been breached, the operator may delete the sensitive data associated with the database, and then notify the producer of the data breach/deletion of the sensitive data. In contrast, applications may only have read access to the sensitive data the respective application is permitted to access. In other words, applications themselves do not have unrestricted access to the sensitive data as this may compromise the sensitive data.

Therefore, newly developed applications that use the sensitive data management system to access sensitive data, as opposed to directly including sensitive data in the programming and files of the application, are far more secure for various reasons. The sensitive data is managed completely separate from the application itself, and thus, access to the application may no longer compromise the sensitive data. In addition, access to the sensitive data is protected by multiple different security layers (e.g., multi-layer authentication schemes, handshake messages, security policies and protocols, etc.), such that restricted access to the sensitive data may be strictly enforced. All in all, the use of the sensitive data management system further secures the sensitive data, reducing data breaches and hacks into the sensitive data, and thereby increasing the network and production capacity at the system.

Turning now to FIG. 1, a communication system 100 is described. The communication system 100 comprises applications 103A-N, a sensitive data management system 106, a server 109, environments 112A-C, and a network 116. The components of the communication system 100 may be associated with an organization or business enterprise developing applications 103A-N, or may be associated with multiple organizations or business enterprises that work together to develop applications 103A-N. While the server 109, sensitive data management system 106, and environments 112A-C are shown as separate from the network 116, in other embodiments, the server 109, sensitive data management system 106, and environments 112A-C may be part of the network 116. The network 116 may be one or more private networks, one or more public networks, or a combination thereof.

Applications 103A-N may refer to software applications created by a developer of an organization associated with the communication system 100. The applications 103A-N may have already been developed and compiled into executable files and/or packages, which may be deployed and executed in association with an environment 112A-C. Each of the applications 103A-N may include code, logic, configuration files, program files, libraries, data, etc., in compiled form.

In some cases, multiple applications 103A-N may be part of a family of related applications 103A-N, for example, when the related applications 103A-N are developed by the same group of developers or a similar producer (e.g., production team head). In this way, the related applications 103A-N may share similar sensitive data 121 across the different environments 112A-C since the same group of developers/producers may register the same sensitive data 121 with the sensitive data management system 106. In another case, two or more applications 103A-N may be related applications 103A-N when the applications 103A-N are directed to solving similar user problems and thus have similar application functionalities. In yet another case, two or more applications 103A-N may be related applications 103A-N when the applications 103A-N are included in the same line of service, and are possibly used by similar types of users. It should be appreciated that the types of applications 103A-N that are grouped together as related is not limited herein.

The server 109 may be a computer system, server software/hardware, or a collection of processors, memories, and/or networking resources, used to implement an application platform 115. For example, the server 109 may be embodied as a cloud-based system, which includes the application platform 115. The application platform 115 may refer to the underlying infrastructure of the server 109 and software framework that supports development, deployment, and execution of the applications 103A-N. The application platform 115 may provide the necessary tools, services, and runtime environments for applications to run consistently across the different non-production environments 112A-C. For example, the application platform 115 may include the runtime environment (different from the environments 112A-C), development tools, integration services, security features, scalability, and performance management features.

The environments 112A-C may be logical portions of the communication system 100 dedicated for the services and functions offered to applications 103A-N within the environments 112A-C. For example, each of the environments 112A-C may correspond to non-production environments 112A-C, in which the applications 103A-N may be executed in for development, testing, and validation tasks to be performed on the applications 103A-N. In this way, applications 103A-N may be running on the application platform 115, in association with an environment 112A-C. As used herein, the phrase "an application 103A-N running in association with an environment 112A-C" refers to an application 103A-N running in an environment 112A-C, such that the application 103A-N is accessing the resources (e.g., test applications, network sites 125A-C, data stores 128A-C and other components) of the environment 112A-C, to fulfill the test/refinement/staging purposes of the environment 112A-C.

Each environment 112A-C may include certain resources or components, which may vary depending on the purpose of the environment 112A-C. In the example shown in FIG. 1, each of the environments 112A-C include resources such as a network site 125A-C and a data store 128A-C, respectively. It should be appreciated that each environment 112A-C may include other components not necessarily depicted in FIG. 1 or described herein, such as, for example, the test applications that perform tasks or tests on the applications 103A-N based on various lines of service. Each of the network sites 125A-C may be a web-based or network platform that may demand an authentication process to access features, contents, or applications within the network sites 125A-C. To this end, the applications 103A-N may need to provide valid credentials, such as sensitive data 121, to gain authorized entry into the network sites 125A-C, ensuring secure access and protecting the functionalities hosted on the network sites 125A-C. The data stores 128A-C may be secured databases or repositories storing information related to the testing/refinement of the applications 103A-N. Access to the data stores 128A-C may be restricted, such that applications 103A-N may need to authenticate with the data stores 128A-C with valid credentials, such as sensitive data 121, to ensure controlled and authorized entry into the data stores 128A-C. The authentication requirements at the network sites 125A-C and the data stores 128A-C may serve to safeguard the data used by the respective environments 112A-C and prevents unauthorized access to the data.

In some cases, the network sites 125A-C and the data stores 128A-C for the different environments 112A-C may be logically segregated. For example, the data stores 128A-C may be stored in the same memories or servers across the communication system 100. However, each of the data stores 128A-C may be logically segregated such that applications 103A-N running in one environment 112A-C may have restricted access to the data stores 129A-C in the other environments 112A-C. That is, an application 103A-N may not access a network site 125A-C or data store 128A-C in one environment 112A-C using the same sensitive data 121 that is used to access a network site 125A-C or data store 128A-C in another environment 112A-C.

Each application 103A-N may be executed on the application platform 115, and during execution of each application 103A-N within a particular environment 112A-C, the application 103A-N may access the network sites 125A-C and data stores 128A-C of the respective environment 112A-C. For example, the application 103A may be run within an environment 112B, which may be a performance testing environment 112B, such that the network site 125B and the data store 128B are related to performance testing tasks of the application 103A. While the application 103A is running at the application platform 115 and in the environment 112B, the application 103A may attempt to access the data store 128B for the purpose of performance testing. However, the data store 128B may require valid authentication credentials from the application 103A to access the data store 128B. In the embodiments disclosed herein, the application 103A does not include or have easy access to the sensitive data 121 that may be used as the valid authentication credentials to access the data store 128B. Instead, the sensitive data 121 that may be used as the valid authentication credentials to access the data store 128B may be stored at the sensitive data management system 106.

The sensitive data management system 106 may be a computer system, server software/hardware, or a collection of processors, memories, and/or networking resources, used to implement the secure management of sensitive data 121 as described herein. For example, the sensitive data management system 106 may be embodied as a cloud-based system, which may include one or more data stores and memories located together or separately across geographically disparate locations. The sensitive data management system 106 may include one or more storage buckets 118A-B. The storage buckets 118A-B may be logical containers or repositories used to store and organize data within the sensitive data management system 106. In an embodiment, each storage bucket 118A-B in the sensitive data management system 106 may be associated with a different application 103A-B, or a different family of related applications 103A-N that may share the same sensitive data 121. That is, storage bucket 118A may be a logical container or repository for storing sensitive data 121 that may be used by application 103A to access network sites 125A-C and data stores 128A-C across various environments 112A-C. Similarly, storage bucket 118B may be a logical container or repository for storing sensitive data 121 that may be used by application 103B to access network sites 125A-C and data stores 128A-C across various environments 112A-C. In this embodiment, within each storage bucket 118A-B, the sensitive data 121 may again be segregated based on an environment 112A-C. As shown in FIG. 1, the storage bucket 118A includes one database 119 for sensitive data 121 that may be used by application 103A to access resources within environment 112A, another database 119 for sensitive data 121 that may be used by application 103A to access resources within environment 112B, and yet another database 119 for sensitive data 121 that may be used by application 103A to access resources within environment 112C. Similarly, the storage bucket 118B includes one database 119 for sensitive data 121 that may be used by application 103B to access resources within environment 112A, another database 119 for sensitive data 121 that may be used by application 103B to access resources within environment 112B, and yet another database 119 for sensitive data 121 that may be used by application 103B to access resources within environment 112C.

In another embodiment, each storage bucket 118A-B may be not only application 103A-N specific, but also environment 112A-C specific. In this embodiment, each storage bucket 118A-B may only include the sensitive data 121 associated with a particular application 103A-N (or a family of related applications 103A-N that may share the same sensitive data 121) and the sensitive data 121 for one environment 112A-C.

In this way, the sensitive data management system 106 may store sensitive data 121, specifically in association with an application 103A-N, and specifically in an association with an environment in which the application 103A-N is running. To this end, each storage bucket 118A may maintain records in association with the sensitive data 121. For example, a record may include an identifier of the application 103A-N, an identifier of the environment 112A-C, and/or an identifier of the network site 125A-C or data store 128A-C, with the corresponding sensitive data 121 used to access the network site 125A-C or data store 128A-C. The foregoing identifiers may be alphanumeric values or codes that uniquely identify the application 103A-N, environment 112A-C, and the network site 125A-C or data store 128A-C.

The sensitive data management system 106 may also include a data management application 122, which may be executable instructions stored at the sensitive data management system 106, for execution by one or more processors of the sensitive data management system 106. The data management application 122 may perform the steps and methods described herein to store sensitive data 121 at the sensitive data management system 106, obtain requests for the sensitive data 121, provide access to the sensitive data 121 when permitted, update the sensitive data 121 in accordance with policies, etc., as further described herein.

While FIG. 1 only shows three environments 112A-C, each including one network site 125A-C and data store 128A-C, it should be appreciated that the communication system 100 may include any number of environments 112A-C, each of which may include any number of components, network sites 125A-C, and/or data stores 128A-C. Similarly, while FIG. 1 only shows two storage buckets 118A-B for two different applications 103A-B, it should be appreciated that the sensitive data management system 106 may include any number of storage buckets 118A-B for any number of applications 103A-N (and possibly environments 112) being developed and tested by the communication system 100.

Referring now to FIGS. 2A-D, shown are block diagrams illustrating various methods related to the management of the sensitive data 121 in the sensitive data management system 106 of FIG. 1 according to various embodiments of the disclosure. Specifically, FIGS. 2A-B relate to authentication methods with the sensitive data management system 106, which serves to enhance the security of the sensitive data 121 maintained within the sensitive data management system 106. Meanwhile FIGS. 2C-D relate to the storage, maintenance, access enforcement, and lifecycle of the sensitive data 121 maintained within the sensitive data management system 106.

Figure 2A:
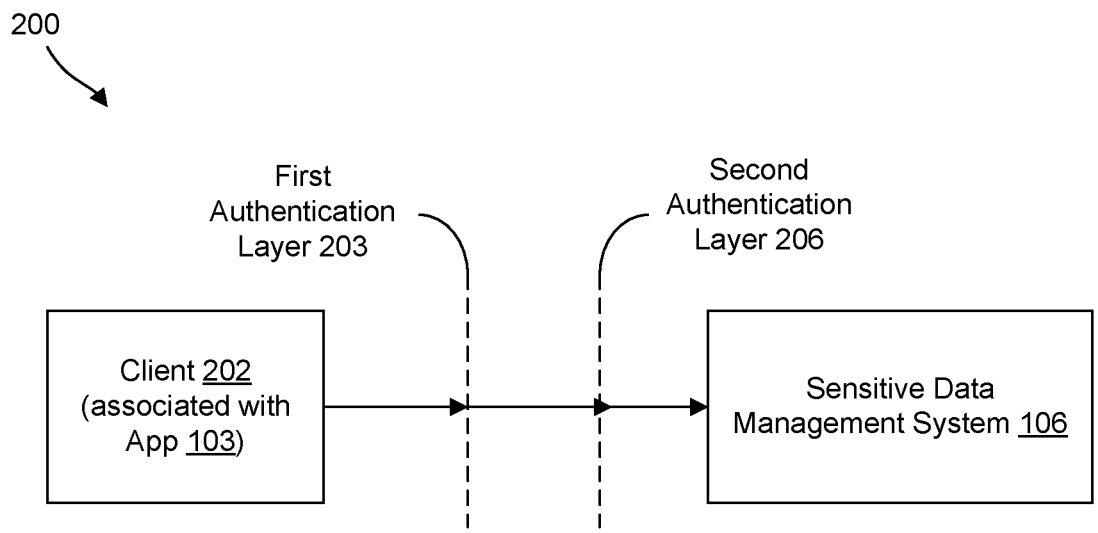
FIGS. 2A-D are block diagrams illustrating sensitive data management in the communication system of FIG. 1 according to various embodiments of the disclosure.

Turning now specifically to FIG. 2A, shown is an authentication method 200 between a developer of the application 103A-N (hereinafter referred to as "application 103") and the sensitive data management system 106. In an embodiment, a developer of the application 103 may provide the sensitive data 121 to the sensitive data management system 106 by first logging-in to the sensitive data management system 106 using a multi-factor authentication scheme, with multiple authentication layers (e.g., the first authentication layer 203 and the second authentication layer 206). For example, a developer of the application 103 may use a separate, client application 202 running on a device of the developer to perform the multi-factor authentication scheme.

Each of the first and second authentication layers 203 and 206 of the multi-factor authentication scheme may involve, for example, requesting the developer to provide, via using the client application 202, for example, two or more of a username and password, one-time password, personal identification number (PIN), a smart card, token, biometrics, geolocation, security questions, access codes, universal serial bus (USB) security keys, etc. In some cases, the client application 202 may receive a notification to approve the login attempt by the client application 202 to the sensitive data management system 106. In some cases, adaptive authentication schemes may be presented to the developer based on various factors, to adjust the forms of identification used to access the sensitive data 121 in the sensitive data management system 106.

Once authenticated, the client application 202 may transmit sensitive data 121 for a newly developed application 103 to the sensitive data management system 106 with an identifier of the application 103 and/or an identifier of the environment 112A-C (hereinafter referred to as "environment 112"). The data management application 122 may store the received sensitive data 121 in a storage bucket 118A-B (hereinafter referred to as "storage bucket 118") in association with the application 103 and the identifier 243.

Figure 2B:
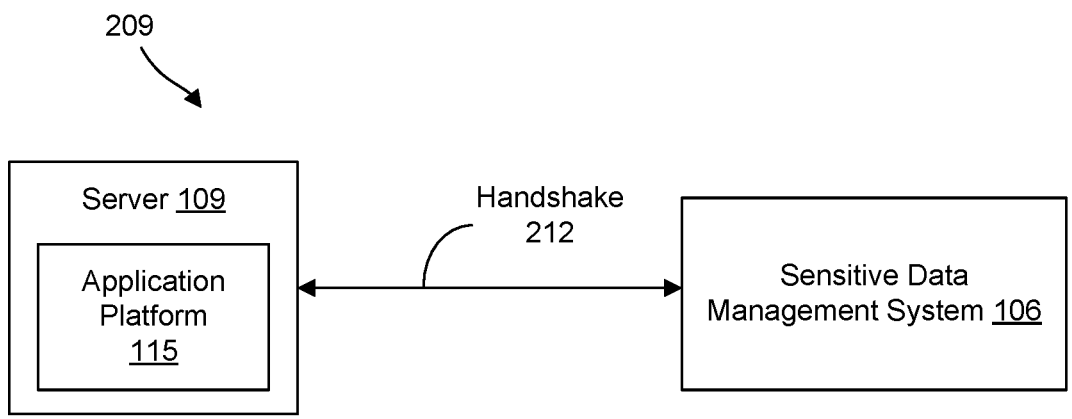

Turning now specifically to FIG. 2B, shown is an authentication method 209 between the server 109 supporting the application platform 115 and the sensitive data management system 106. The application platform 115 may authenticate with the sensitive data management system 106 using, for example, a handshake 212. The handshake 212 may involve the application platform 115 and the sensitive data management system 106 establishing communications and negotiating parameters for exchanging data. For example, the application platform 115 may initiate communications with the sensitive data management system 106 and specify protocols used for communication, encryption algorithms, and data formats. The application platform 115 and the sensitive data management system 106 may authenticate identities to ensure that the communication is secure and authorized using the handshake 212. For example, the handshake 212 may involve the exchange of credentials, certificates, tokens, or some other forms of identification of the application platform 115 and/or the sensitive data management system 106. In some cases, an operator of the sensitive data management system 106 may program the sensitive data management system 106 with identifications of application platforms 115 that are permitted to communicate with the sensitive data management system 106 and/or prohibited from communicating with sensitive data management system 106. The handshake 212 may include other steps, such as a parameter exchange and a confirmation, which are not limited herein.

Figure 2C:
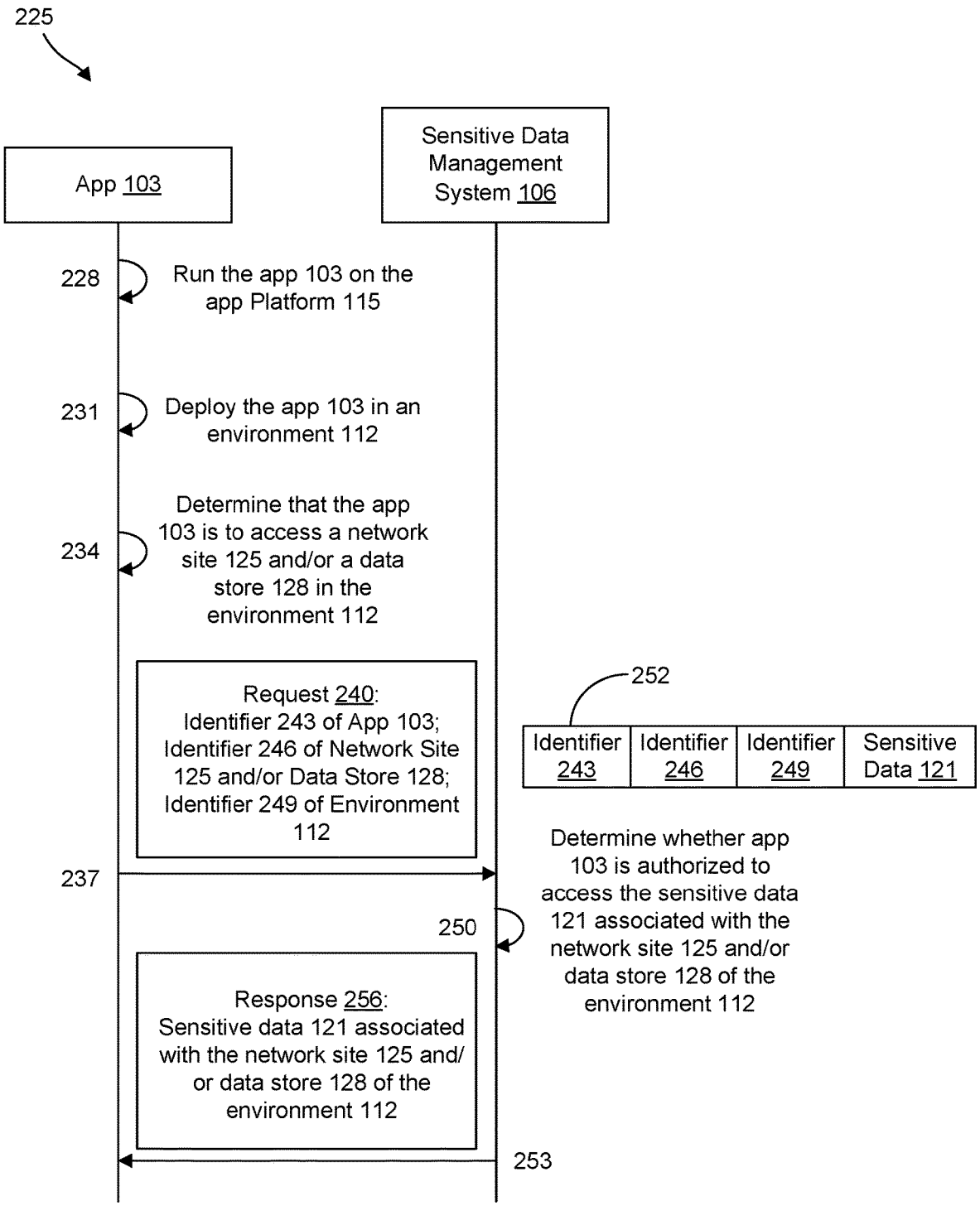

Referring now to FIG. 2C, shown is a message sequence diagram illustrating a method 225 of managing sensitive data 121 at the sensitive data management system 106. The method 225 may be performed based on communications between an application 103 and the sensitive data management system 106, or more specifically, the data management application 122 in the sensitive data management system 106. Method 225 may be performed after the sensitive data 121 for the application 103 has been stored to the sensitive data management system 106 and after the application platform 115 has authenticated with the sensitive data management system 106 (e.g., using the handshake 212).

At step 228, method 225 may begin when the application 103 is sent to the server 109 for execution at the application platform 115, using the runtime environment and libraries available through the application platform 115. At step 231, the application 103 may be deployed (e.g., running or executing) in association with an environment 112, which may be, for example, a testing non-production environment 112. Within the environment 112, the application 103 may have access to a certain set of resources, such as, for example, test applications, network sites 125A-C (herein after referred to as "network sites 125"), and data stores 128A-C (hereinafter referred to as "data stores 128").

At step 234, the application 103 may determine that, to perform a particular test in the environment 112, the application 103 may have to access a network site 125 or a data store 128 in the environment 112. For example, the application 103 may have to access data in a data store 128 in the environment 112 to perform an integration test with another test application in the environment 112. However, the application 103 may have to provide valid authentication credentials (e.g., sensitive data 121) to access the data store 128 in the environment 112.

At step 237, the application 103 may generate a request 240 for the sensitive data 121 used to access the network site 125 or the data store 128 in the environment 112, and send the request 240 to the sensitive data management system 106. As shown in FIG. 2C, the request 240 may include an identifier 243 of the application 103, an identifier 246 of the network site 125 or the data store 128 in the environment 112, and/or an identifier 249 of the environment 112. The identifier 243 of the application 103, identifier 246 of the network site 125 or the data store 128 in the environment 112, and/or identifier 249 of the environment 112 may each be alphanumeric values or codes that uniquely identify the application 103, the network site 125 or the data store 128, and/or the environment 112, respectively.

At step 250, the data management application 122 at the sensitive data management system 106 may obtain the request 240 and determine whether the application 103 is authorized to access the requested sensitive data 121, specific to the application 103 and the environment 112. For example, the data management application 122 may first search for a storage bucket 118 associated with the identifier 243 of the application 103. When the data management application 122 determines that sensitive data 121 associated with the identifier 243 of the application 103 is indeed stored at the sensitive data management system 106 in a storage bucket 118, the data management application 122 may search the records 252 in the storage bucket 118 to locate the requested sensitive data 121.

For example, the data management application 122 may search the storage bucket 118 to obtain a record 252 indicating the identifier 243 of the application 103, the identifier 246 of the requested network site 125 or the data store 128 in the environment 112, and/or the identifier 249 of the environment 112, each in association with the requested sensitive data 121. The storage buckets 118 at the sensitive data management system 106 may store similar records 252 for all of the sensitive data 121 maintained at the sensitive data management system 106. For example, the sensitive data 121 may be stored in a record 252 in association with the foregoing identifiers 243, 246, and/or 249, such that the data management application 122 may use the identifiers 243, 246, and/or 249 to efficiently access the requested sensitive data 121 in response to a request 240 from an authorized application 103 (e.g., an application 103 with sensitive data 121 stored at the sensitive data management system 106).

When found, at step 253, the data management application 122 may obtain (e.g., extract and package) the requested sensitive data 121 in a secure format (e.g., via encryption), for transmission back to the application 103 in a response 256. The response 256 may include the requested sensitive data 121 associated with the network site 125 and/or data store 128 of the environment 112 that the application 103 is attempting to access, while running in association with the environment 112. In contrast, when the requested sensitive data 121 is not found at the sensitive data management system 106, the data management application 122 may transmit, in the response 256, an indication that the sensitive data 121 that may be used to access the network site 125 or data store 128 is not available at the sensitive data management system 106.

Figure 2D:
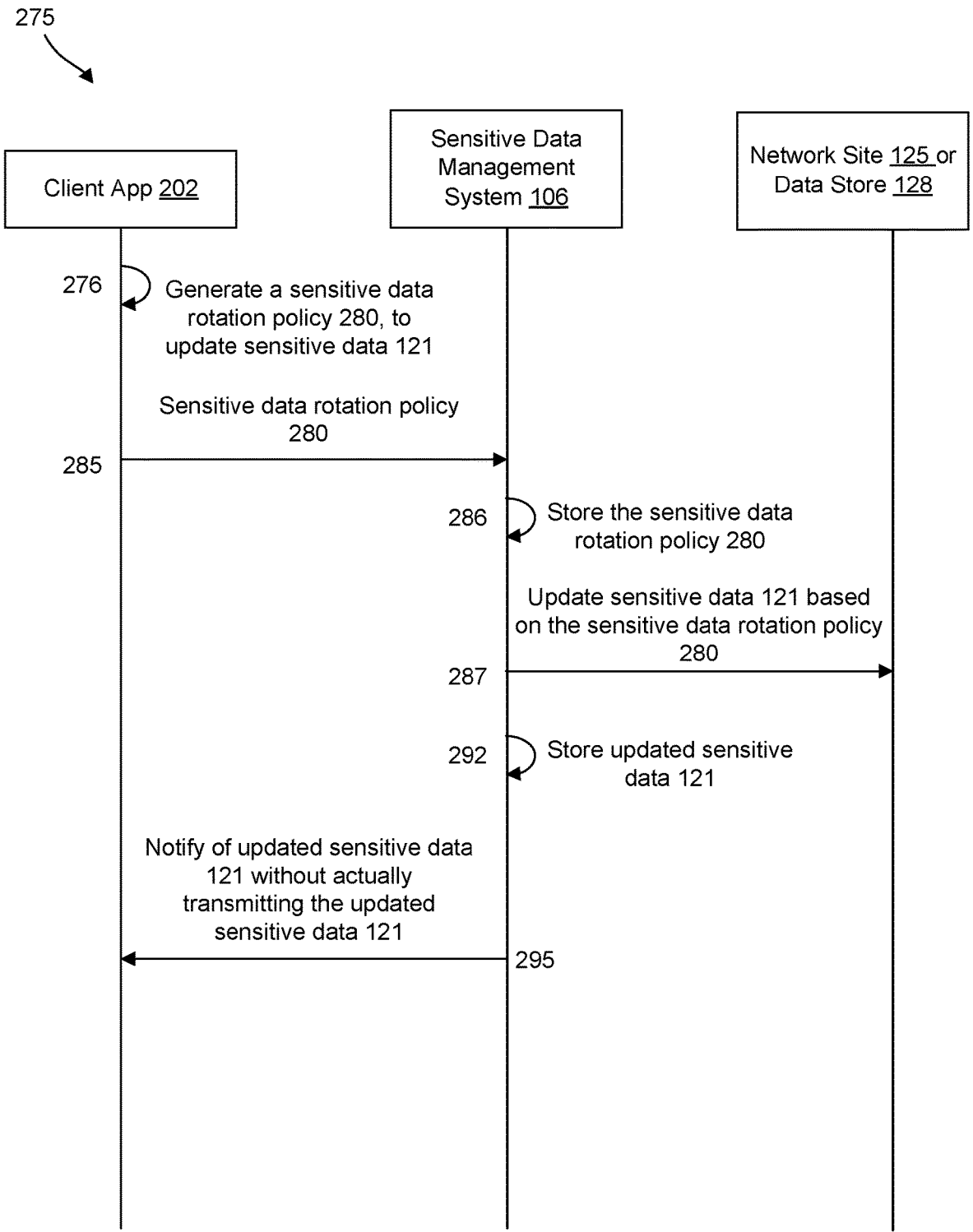

Referring now to FIG. 2D, shown is a message sequence diagram illustrating a method 275 of updating sensitive data 121 at the sensitive data management system 106. The method 275 may be performed based on communications between a client application 202, the sensitive data management system 106 (e.g., the data management application 122), and/or the network site 125 or data store 128. Method 275 may be performed after the sensitive data 121 for the application 103 has been stored to the sensitive data management system 106 and after the application platform 115 has authenticated with the sensitive data management system 106 (e.g., using the handshake 212).

At step 276, the developer of the application 103 may operate a client application 202 at a device of the developer to generate a sensitive data rotation policy 280, which may include the rules and conditions in response to which the data management application 122 may be programmed to update the sensitive data 121. For example, the sensitive data rotation policy 180 may define that sensitive data 121 for a particular application 103 and/or an environment 112 is permitted be updated and should be updated in response to a request from the developer or a request from an operator of the sensitive data management system 106.

The sensitive data rotation policy 180 may also define that sensitive data 121 for a particular application 103 and/or an environment 112 is prohibited from being updated in response to a request from the developer or a request from an operator of the sensitive data management system 106 (i.e., heavily restrict write access to this sensitive data 121). This may result in the data management application 122 being configured to first check the sensitive data rotation policy 280 to determine whether updating certain types of sensitive data 121 is permitted based on received requests, and then subsequently updating the sensitive data 121 as requested if permitted. The sensitive data rotation policy 280 may also define that sensitive data 121 for a particular application 103 and/or an environment 112 is to be updated according to a predetermined schedule (e.g., default or developer-specified), or even based on regulatory or organizational requirements. At step 285, the client application 202 may transmit the sensitive data rotation policy 280 to the sensitive data management system 106. At step 286, the data management application 122 may store the sensitive data rotation policy 280 in the sensitive data management system 106, and the data management application 122 may be configured to update the sensitive data 121 for particular applications 103 and/or environments 112 based on the sensitive data rotation policy 280.

At step 287, the data management application 122 may detect an event associated with a rule or condition indicated in a sensitive data rotation policy 280, which may trigger the data management application 122 to update sensitive data 121 for an application 103 and/or environment 112. For example, a regulatory or organizational rule in a sensitive data rotation policy 280 may indicate that sensitive data 121 for all applications 103 belonging to a particular organization should be updated every two months. The data management application 122 may identify the applications 103 belonging to this particular organization, and update the sensitive data 121 for these applications 103 every two months. This may involve the data management application 122 communicating directly with the network sites 125 and/or data stores 128 to update the sensitive data 121 every two months. In this case, the data management application 122 may determine the updated sensitive data 121 based on, for example, a predefined set of rules prescribed by the developer and programmed into the data management application 122, or based on a randomized algorithm.

The data management application 122 may update the sensitive data 121 at the network sites 125 and/or data stores 128. At step 292, data management application 122 may then store the updated sensitive data 121 in the storage bucket 118 for the applications 103 of the organization and in association with the environment 112. At step 295, the data management application 122 may transmit a notification to the client application 202 indicating that the sensitive data 121 for the application 103, in association with certain environments 112, has been updated based on the data rotation policy 280. Notably, the notification may not actually include the updated sensitive data 121, such that updated sensitive data 121 is not unnecessarily forwarded through the communication system 100, leaving itself vulnerable to hacks and security attacks.

Alternatively, the data management application 122 may transmit an alert to the client application 202, instructing the developer to communicate directly with the network sites 125 and/or data stores 128 to update the sensitive data 121 every two months. In this case, after updating the sensitive data 121, the developer of the application 103 may authenticate with the sensitive data management system 106 using the authentication method 200 of FIG. 2A, to register the updated sensitive data 121 with the sensitive data management system 106.

Figure 3:
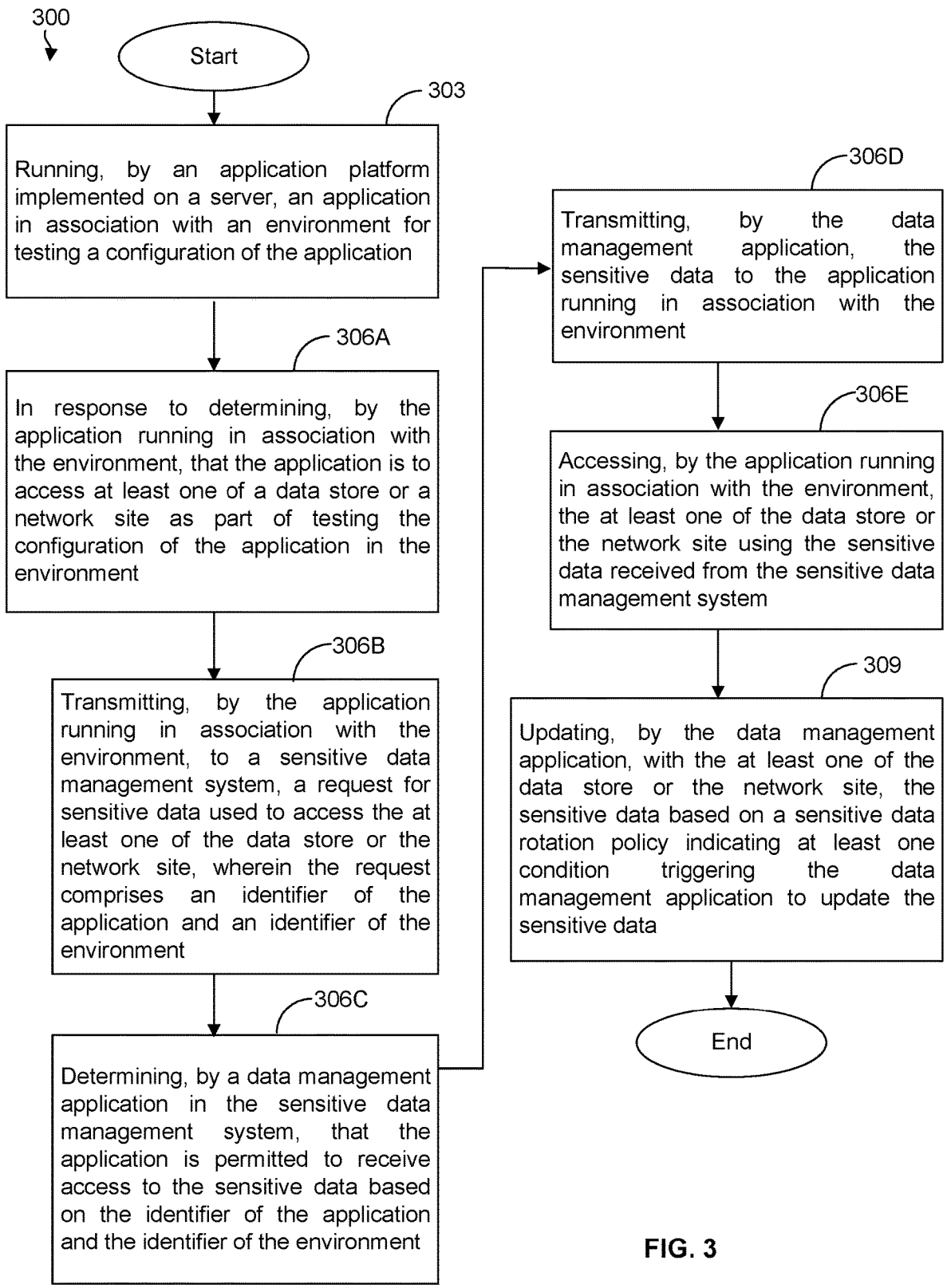
FIG. 3 is a flowchart of a first method of load balancing between multiple traffic flows according to various embodiments of the disclosure.

Referring now to FIG. 3, shown is a method 300 for performing sensitive data management according to various embodiments of the disclosure. Method 300 may be performed by the application platform 115 and the data management application 122 of the sensitive data management system 106. Method 300 may be implemented after the sensitive data 121 for an application 103, executing in one or more environments 112, has been registered and stored at the sensitive data management system 106. Method 300 may also be performed after the application platform 115 has implemented the authentication method 209 of FIG. 2B, such that applications 103 running on the application platform 115 are authorized to request access to sensitive data 121 at the sensitive data management system 106.

At step 303, method 300 comprises running, by an application platform 115 implemented on a server 109, an application 103 in association with an environment 112 for testing a configuration of the application 103.

At step 306A, method 300 may first comprise determining, by the application 103 running in association with the environment 112, that the application 103 is to access at least one of a data store 128 or a network site 125 as part of testing the configuration of the application 103 in the environment 112. In response to determining, at step 306A, by the application running in association with the environment, that the application 103 is to access at least one of a data store 128 or a network site 125 as part of testing the configuration of the application 103 in the environment 112, method 300 may proceed to steps 306B, 306C, 306D, and 306E.

At step 306B, method 300 may comprise transmitting, by the application 103 running in association with the environment 112, to a sensitive data management system 106, a request 240 for sensitive data 121 used to access the at least one of the data store 128 or the network site 125. In an embodiment, the request 240 comprises an identifier 243 of the application 103 and an identifier 246 of the environment 112. At step 306C, method 300 may comprise determining, by a data management application 122 in sensitive data management system 106, that the application 103 is permitted to receive access to the sensitive data 121 based on the identifier 243 of the application 103 and the identifier 246 of the environment 112. At step 306D, method 300 may comprise transmitting, by the data management application 122, the sensitive data 121 to the application 103 running in association with the environment 112. At step 306E, method 300 may comprise accessing, by the application 103 running in association with the environment 112, the at least one of the data store 128 or the network site 125 using the sensitive data 121 received from the sensitive data management system 106. At step 309, method 300 may comprise updating, by the data management application 122, with the at least one of the data store 128 or the network site 125, the sensitive data 121 based on a sensitive data rotation policy 280 indicating at least one condition triggering the data management application 122 to update the sensitive data 121.

Method 300 may include other steps and/or features that are not otherwise shown in FIG. 3. In an embodiment, method 300 may further comprise authenticating the application platform 115 with the sensitive data management system 106 using a handshake 212. In an embodiment, the request 240 further comprises an identifier 249 of the at least one of the data store 128 or the network site 125. In an embodiment, method 300 may further comprise storing, in the sensitive data management system 106, the sensitive data 121 in a first storage bucket 118 allocated to the application 103 and/or the environment 112, wherein sensitive data 121 for different applications 103 and different environments 112 are stored in the sensitive data management system 106 in different storage buckets 118. In an embodiment, the sensitive data rotation policy 280 is based on at least one of a predetermined schedule, a request received by a developer of the application 103, a notification received from an operator of the sensitive data management system 106, organizational policies and regulations, or indications of a security breach. In an embodiment, method 300 may further comprise transmitting, by the data management application 122, a notification to the application 103 running in association with the environment 112, wherein the notification indicates that the sensitive data 121 has been updated, wherein the notification excludes the updated sensitive data 121. In an embodiment, method 300 may further comprise deleting, by the data management application 122, the sensitive data 121 from the sensitive data management system 106 in response to receiving a notification from an operator of the sensitive data management system 106 that security at the at least one of the data store 128 or the network site 125 has been compromised. In an embodiment, method 300 may further comprise running, by the application platform 115, a second application 103 in association with the environment 112, storing, in the sensitive data management system 106, an indication that the application 103 and the second application 103 share the sensitive data 121 in the environment 112, and in response to determining, by the second application 103 running in association with the environment 112, that the second application 103 is to access the at least one of the data store 128 or the network site 125 as part of testing a second configuration of the second application 103 in the environment 112, transmitting, by the second application 103, to the sensitive data management system 106, a second request 240 for the sensitive data 121 used to access the at least one of the data store 128 or the network site 125, wherein the request 240 comprises an identifier 243 of the second application 103 and the identifier 246 of the environment 112, determining, by the data management application 122, that the second application 103 is permitted to receive access to the sensitive data 121 based on the identifier 243 of the second application 103 and the identifier 246 of the environment 112, and transmitting, by the data management application 122, the sensitive data 121 to the second application 103 running in association with the environment 112.

Figure 4:
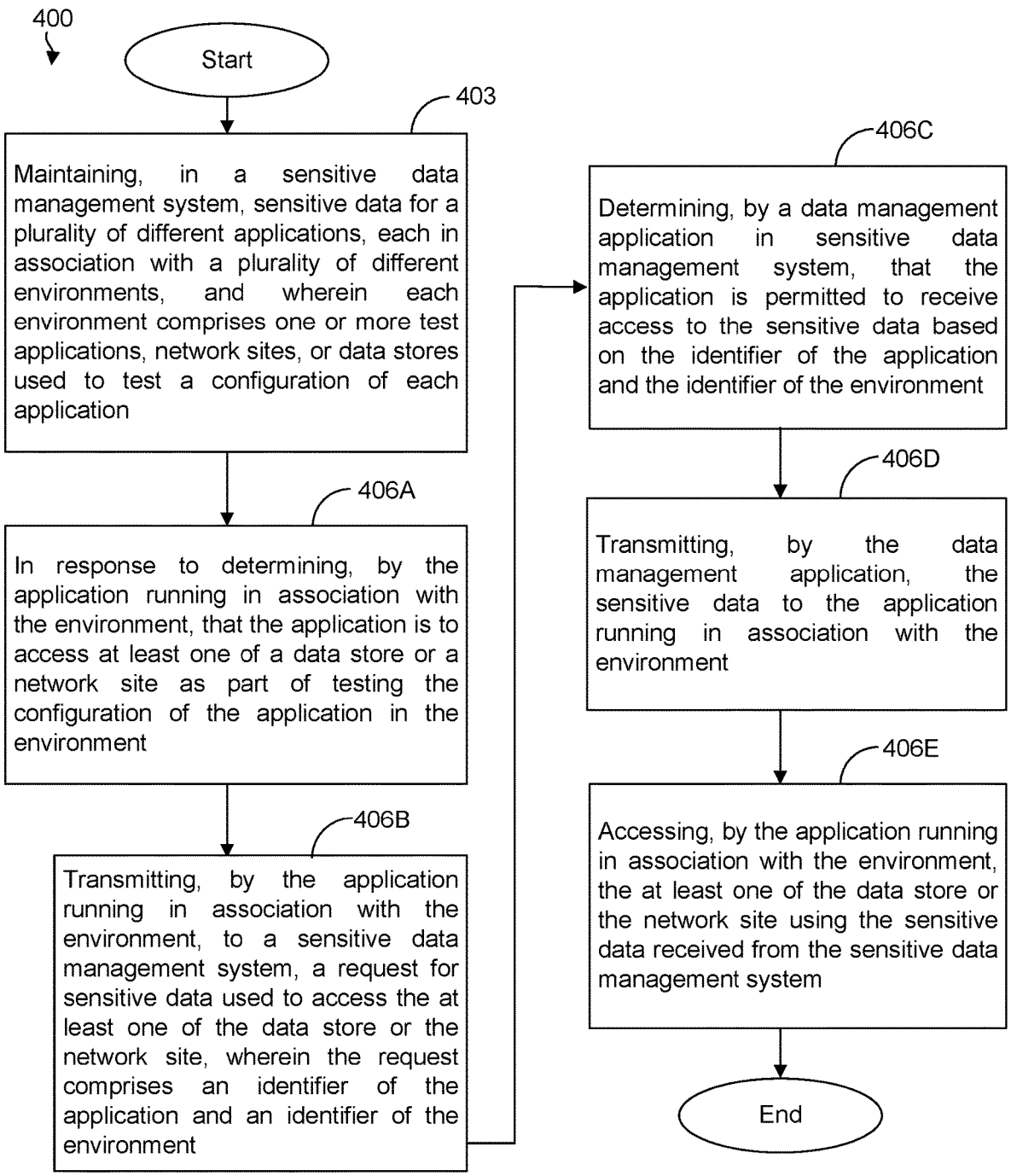
FIG. 4 is a flowchart of a second method of load balancing between multiple traffic flows according to various embodiments of the disclosure.

Referring now to FIG. 4, shown is a method 400 for performing sensitive data management according to various embodiments of the disclosure. Method 400 may be performed by the application platform 115 and the data management application 122 of the sensitive data management system 106. Method 400 may be implemented after the sensitive data 121 for an application 103, executing in one or more environments 112, has been registered and stored at the sensitive data management system 106. Method 400 may also be performed after the application platform 115 has implemented the authentication method 209 of FIG. 2B, such that applications 103 running on the application platform 115 are authorized to request access to sensitive data 121 at the sensitive data management system 106.

At step 403, method 400 may comprise maintaining, in a sensitive data management system 106, sensitive data 121 for a plurality of different applications 103, each in association with a plurality of different environments 112. In an embodiment, each environment 112 comprises one or more test applications, network sites 125, or data stores 228 used to test a configuration of each application 103.

At step 406A, method 400 may first comprise determining, by the application 103 running in association with the environment 112, that the application 103 is to access at least one of a data store 128 or a network site 125 as part of testing the configuration of the application 103 in the environment 112. In response to determining, at step 406A, by the application running in association with the environment, that the application 103 is to access at least one of a data store 128 or a network site 125 as part of testing the configuration of the application 103 in the environment 112, method 400 may proceed to steps 406B, 406C, 406D, and 406E.

At step 406B, method 400 may comprise transmitting, by the application 103 running in association with the environment 112, to a sensitive data management system 106, a request 240 for sensitive data 121 used to access the at least one of the data store 128 or the network site 125. In an embodiment, the request 240 comprises an identifier 243 of the application 103 and an identifier 246 of the environment 112. At step 406C, method 400 may comprise determining, by a data management application 122 in sensitive data management system 106, that the application 103 is permitted to receive access to the sensitive data 121 based on the identifier 243 of the application 103 and the identifier 246 of the environment 112. At step 406D, method 400 may comprise transmitting, by the data management application 122, the sensitive data 121 to the application 103 running in association with the environment 112. At step 406E, method 400 may comprise accessing, by the application 103 running in association with the environment 112, the at least one of the data store 128 or the network site 125 using the sensitive data 121 received from the sensitive data management system 106.

Method 400 may include other steps and/or features that are not otherwise shown in FIG. 4. In an embodiment, method 400 may further comprise performing, by a client application 202 associated with a developer of the application 103, a multi-layered authentication method 200 with the sensitive data management system 106, transmitting, by the client application 202 to the sensitive data management system 106, the sensitive data 121 in association with the identifier 243 of the application 103 and the identifier 246 of the environment 112, and storing, at a storage bucket 118, the sensitive data 121 in association with the identifier 243 of the application 103 and the identifier 246 of the environment 112, in which the storage bucket 118 is associated with at least one of the application 103 or the environment 112 such that only sensitive data 121 used with the application 103 running in the environment 112 is permitted to be stored in the storage bucket 118. In an embodiment, method 400 may further comprise updating, by the data management application 122, with the at least one of the data store 128 or the network site 125, the sensitive data 121 based on a sensitive data rotation policy 280 indicating at least one condition for updating of the sensitive data 121, wherein the sensitive data rotation policy 280 is based on at least one of a predetermined schedule, a request received by a developer of the application 103, a notification received from an operator of the sensitive data management system 106, organizational policies and regulations, or indications of a security breach. In an embodiment, method 400 may further comprise authenticating an application platform 115 implemented on a server 109 with the sensitive data management system 106 using a handshake 212, and running, by the application platform 115, the application 103 in association with the environment 112 for testing the configuration of the application 103.

In an embodiment, method 400 may further comprise storing, in the sensitive data management system 106, an indication that the application 103 and a second application 103 share the sensitive data 121 in the environment 112, and in response to determining, by the second application 103 running in association with the environment 112, that the second application 103 is to access the at least one of the data store 128 or the network site 125 as part of testing a second configuration of the second application 103 in the environment 112, transmitting, by the second application 103, to the sensitive data management system 106, a second request 240 for the sensitive data 121 used to access the at least one of the data store 128 or the network site 125, wherein the request 240 comprises an identifier 243 of the second application 103 and the identifier 246 of the environment 112, determining, by the data management application 122, that the second application 103 is permitted to receive access to the sensitive data 121 based on the identifier 243 of the second application 103 and the identifier 246 of the environment 112, and transmitting, by the data management application 122, the sensitive data 121 to the second application 103 running in association with the environment 112. In an embodiment, the environment 112 is a non-production environment used for development, testing, and validation of the application before deploying the application to a live production environment.

Figure 5:
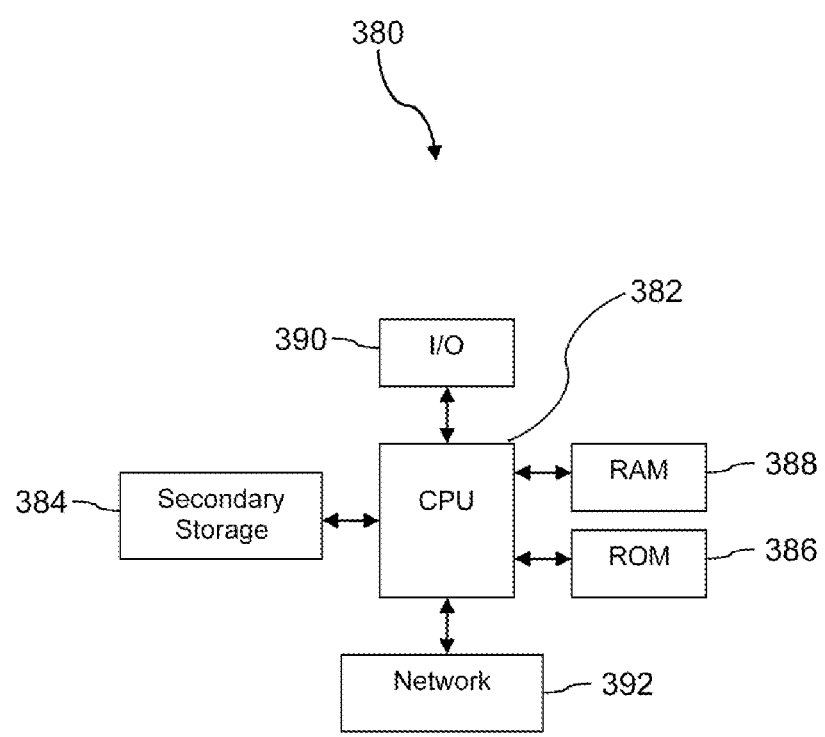
FIG. 5 is a block diagram of a computer system implemented within the communication system of FIG. 1 according to an embodiment of the disclosure.

FIG. 5 illustrates a computer system 380 suitable for implementing one or more embodiments disclosed herein. In an embodiment, the sensitive data management system 106 and/or the server 109 may each be implemented as the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a communication system to perform sensitive data management, wherein the method comprises:
running, by an application platform implemented on a server, an application in association with an environment for testing a configuration of the application;
in response to determining, by the application running in association with the environment, that the application is to access at least one of a data store or a network site as part of testing the configuration of the application in the environment:
transmitting, by the application running in association with the environment, to a sensitive data management system, a request for sensitive data used to access the at least one of the data store or the network site, wherein the request comprises an identifier of the application and an identifier of the environment;
determining, by a data management application in the sensitive data management system, that the application is permitted to receive access to the sensitive data based on the identifier of the application and the identifier of the environment;
transmitting, by the data management application, the sensitive data to the application running in association with the environment; and accessing, by the application running in association with the environment, the at least one of the data store or the network site using the sensitive data received from the sensitive data management system, wherein the sensitive data remains securely stored at the sensitive data management system and unexposed as the application runs in different environments; and updating, by the data management application, with the at least one of the data store or the network site, the sensitive data based on a sensitive data rotation policy indicating at least one condition triggering the data management application to update the sensitive data.

2. The method of claim 1, further comprising authenticating the application platform with the sensitive data management system using a handshake procedure.

3. The method of claim 1, wherein the request further comprises an identifier of the at least one of the data store or the network site.

4. The method of claim 1, further comprising storing, in the sensitive data management system, the sensitive data in a first storage bucket allocated to the application and the environment, wherein sensitive data for different applications and different environments are stored in the sensitive data management system in different storage buckets.

5. The method of claim 1, wherein the sensitive data rotation policy is based on at least one of a predetermined schedule, a request received by a developer of the application, a notification received from an operator of the sensitive data management system, organizational policies and regulations, or indications of a security breach.

6. The method of claim 1, further comprising transmitting, by the data management application, a notification to the application running in association with the environment, wherein the notification indicates that the sensitive data has been updated without including the sensitive data, wherein the notification excludes the sensitive data.

7. The method of claim 1, further comprising deleting, by the data management application, the sensitive data from the sensitive data management system in response to receiving a notification from an operator of the sensitive data management system that a security at the at least one of the data store or the network site has been compromised.

8. The method of claim 1, further comprising:
running, by the application platform, a second application in association with the environment;
storing, in the sensitive data management system, an indication that the application and the second application share the sensitive data in the environment; and
in response to determining, by the second application running in association with the environment, that the second application is to access the at least one of the data store or the network site as part of testing a second configuration of the second application in the environment:
transmitting, by the second application, to the sensitive data management system, a second request for the sensitive data used to access the at least one of the data store or the network site, wherein the request comprises an identifier of the second application and the identifier of the environment;
determining, by the data management application, that the second application is permitted to receive access to the sensitive data based on the identifier of the second application and the identifier of the environment; and transmitting, by the data management application, the sensitive data to the second application running in association with the environment.

9. A communication system, comprising:
a sensitive data management system comprising:
at least one memory configured to maintain sensitive data for a plurality of different applications, each in association with a plurality of different environments, and wherein each environment comprises one or more test applications, network sites, or data stores used to test a configuration of each application; and
a data management application stored in the at least one memory; and
an application running in association with an environment and on an application platform of a server, wherein when the application is executed by at least one processor, the application causes the at least one processor to be configured to:
determine that the application is to access at least one of a data store or a network site as part of testing the configuration of the application in the environment; and
transmit to the sensitive data management system, a request for sensitive data used to access the at least one of the data store or the network site, wherein the request comprises an identifier of the application and an identifier of the environment;
wherein the data management application of the sensitive data management system, when executed by the at least one processor, causes the at least one processor to be configured to:
determine that the application is permitted to receive access to the sensitive data based on the identifier of the application and the identifier of the environment; and
transmit the sensitive data to the application running in association with the environment, and
wherein the application, when executed by the at least one processor, further causes the at least one processor to be configured to access at least one of the data store or the network site using the sensitive data received from the sensitive data management system.

10. The communication system of claim 9, further comprising a client application, which when executed by the at least one processor, causes the at least one processor to be further configured to:
perform a multi-layered authentication method with the sensitive data management system; and
transmit, to the sensitive data management system, the sensitive data in association with the identifier of the application and the identifier of the environment; and
wherein the data management application of the sensitive data management system, when executed by the at least one processor, causes the at least one processor to be configured to store, at a storage bucket in the sensitive data management system, the sensitive data in association with the identifier of the application and the identifier of the environment, wherein the storage bucket is associated with at least one of the application or the environment such that only data used with the application running in the environment is permitted to be stored in the storage bucket.

11. The communication system of claim 9, wherein the data management application of the sensitive data management system, when executed by the at least one processor, causes the at least one processor to be configured to update the sensitive data with the at least one of the data store or the network site based on a sensitive data rotation policy indicating at least one condition for updating of the sensitive data.

12. The communication system of claim 9, wherein the data management application of the sensitive data management system, when executed by the at least one processor, causes the at least one processor to be configured to authenticate an application platform implemented on a server with the sensitive data management system using a handshake.

13. The communication system of claim 9, wherein the environment is a non-production environment used for development, testing, and validation of the application before deploying the application to a live production environment.

14. The communication system of claim 9, wherein the data management application of the sensitive data management system, when executed by the at least one processor, causes the at least one processor to be configured to encrypt the sensitive data and decrypt the sensitive data.

15. A method implemented in a communication system to perform sensitive data management, wherein the method comprises:
  maintaining, in a sensitive data management system, sensitive data for a plurality of different applications, each in association with a plurality of different environments, and wherein each environment comprises one or more test applications, network sites, or data stores used to test a configuration of each application;
  in response to determining, by an application running in association with an environment, that the application is to access at least one of a data store or a network site as part of testing the configuration of the application in the environment:
    transmitting, by the application running in association with the environment, to a sensitive data management system, a request for sensitive data used to access the at least one of the data store or the network site, wherein the request comprises an identifier of the application and an identifier of the environment;
    determining, by a data management application in sensitive data management system, that the application is permitted to receive access to the sensitive data based on the identifier of the application and the identifier of the environment;
    transmitting, by the data management application, the sensitive data to the application running in association with the environment; and
    accessing, by the application running in association with the environment, the at least one of the data store or the network site using the sensitive data received from the sensitive data management system.

16. The method of claim 15, further comprising:
  performing, by a client application associated with a developer of the application, a multi-layered authentication method with the sensitive data management system;
  transmitting, by the client application to the sensitive data management system, the sensitive data in association with the identifier of the application and the identifier of the environment; and
  storing, at a storage bucket in the sensitive data management system, the sensitive data in association with the identifier of the application and the identifier of the environment, wherein the storage bucket is associated with at least one of the application or the environment such that only data used with the application running in the environment is permitted to be stored in the storage bucket.

17. The method of claim 15, further comprising updating, by the data management application, with the at least one of the data store or the network site, the sensitive data based on a sensitive data rotation policy indicating at least one condition for updating of the sensitive data, wherein the sensitive data rotation policy is based on at least one of a predetermined schedule, a request received by a developer of the application, a notification received from an operator of the sensitive data management system, organizational policies and regulations, or indications of a security breach.

18. The method of claim 15, further comprising:
  authenticating an application platform implemented on a server with the sensitive data management system using a handshake; and
  running, by the application platform, the application in association with the environment for testing the configuration of the application.

19. The method of claim 15, further comprising:
  storing, in the sensitive data management system, an indication that the application and a second application share the sensitive data in the environment;
  in response to determining, by the second application running in association with the environment, that the second application is to access the at least one of the data store or the network site as part of testing a second configuration of the second application in the environment:
    transmitting, by the application running in association with the environment, to a sensitive data management system, a second request for the sensitive data used to access the at least one of the data store or the network site, wherein the request comprises an identifier of the second application and the identifier of the environment;
    determining, by the data management application, that the second application is permitted to receive access to the sensitive data based on the identifier of the second application and the identifier of the environment; and
    transmitting, by the data management application, the sensitive data to the second application running in association with the environment.

20. The method of claim 15, wherein the environment is a non-production environment used for development, testing, and validation of the application before deploying the application to a live production environment.

* * * * *